US006834619B1

United States Patent
Rampersad

(10) Patent No.: US 6,834,619 B1
(45) Date of Patent: Dec. 28, 2004

(54) PET GROOMING MITT WITH CONTINUOUS RESERVOIR

(76) Inventor: Kenrick Rampersad, 26 Ardmore Dr., Brentwood, NY (US) 11771

( * ) Notice: Subject to any disclaimer, the term of this patent is extended or adjusted under 35 U.S.C. 154(b) by 0 days.

(21) Appl. No.: 09/649,785

(22) Filed: Aug. 29, 2000

Related U.S. Application Data

(63) Continuation of application No. 09/235,687, filed on Jan. 22, 1999, now Pat. No. 6,109,214.

(51) Int. Cl.[7] .............................................. A01K 13/00
(52) U.S. Cl. ......................... 119/603; 119/601; 119/611
(58) Field of Search .................. 119/601, 600, 119/602, 603, 604, 620, 633, 625, 665, 611, 612, 632, 664, 652; 401/7; 15/227

(56) References Cited

U.S. PATENT DOCUMENTS

| | | | | | |
|---|---|---|---|---|---|
| 1,012,634 A | * | 12/1911 | Guild | ........................... | 15/398 |
| 1,064,641 A | * | 6/1913 | Halstead | ...................... | 401/28 |
| 1,481,772 A | * | 1/1924 | Zell | .............................. | 401/7 |
| 1,607,674 A | * | 11/1926 | Ives | ........................... | 132/114 |
| 2,569,067 A | * | 9/1951 | Livshin | ........................ | 15/227 |
| 2,663,890 A | * | 12/1953 | Sullins | ........................... | 401/7 |
| 3,778,172 A | * | 12/1973 | Myren | ............................ | 401/7 |
| 4,107,840 A | * | 8/1978 | Kupperman et al. | ........... | 30/172 |
| 4,543,913 A | * | 10/1985 | Wilkeson | .................... | 119/603 |
| 4,617,875 A | * | 10/1986 | Holland | ...................... | 119/603 |
| 5,169,251 A | * | 12/1992 | Davis | ............................ | 401/7 |
| 5,441,355 A | * | 8/1995 | Moore | ........................... | 401/7 |
| 5,682,837 A | * | 11/1997 | Courtney et al. | ........... | 119/625 |

* cited by examiner

Primary Examiner—Son T. Nguyen
(74) Attorney, Agent, or Firm—Alfred M. Walker

(57) ABSTRACT

A mitt grooms and washes a pet such as a dog or cat. The rubber mitt has a built-in reservoir, with discharge ports and massage nibs for efficient pet grooming. Purposeful patterns of densely placed rubber nibs along the longitudinally extending medial area of the palm side engage pet hairs, remove snags and loose hairs, and provide effective massage. The grooming mitt is molded of rubber, and includes a rigid thumb section which provides stability to the mitt, to permit more effective, rapid use and easy discharging of cleaning fluid from the entire surface of the palm side of the mitt.

8 Claims, 5 Drawing Sheets

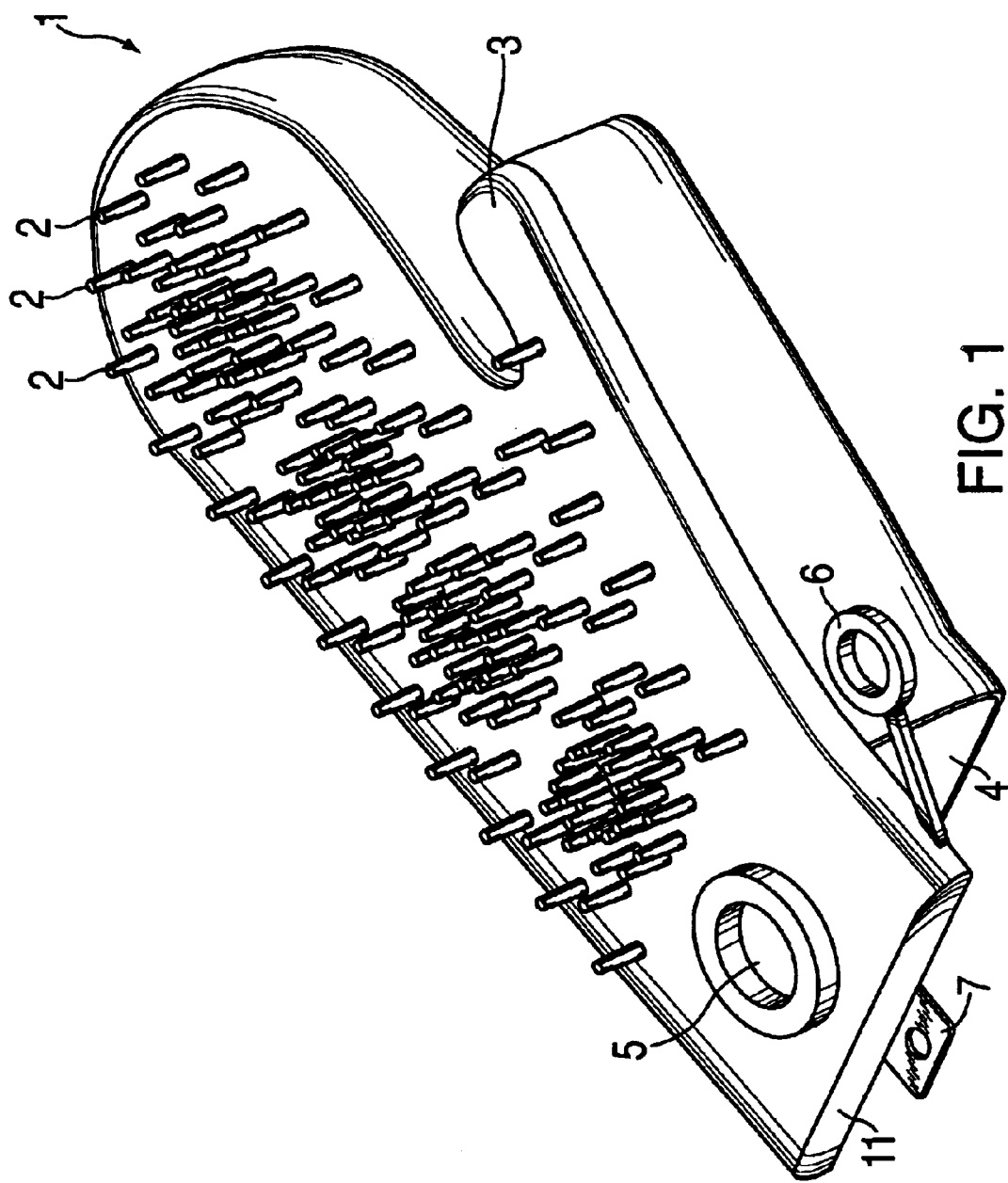

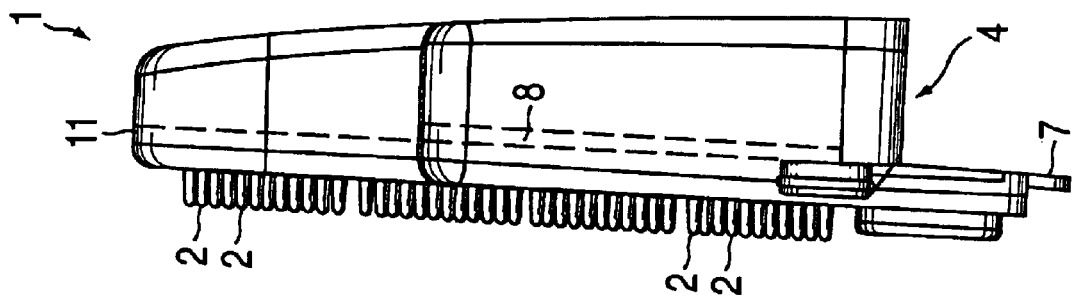
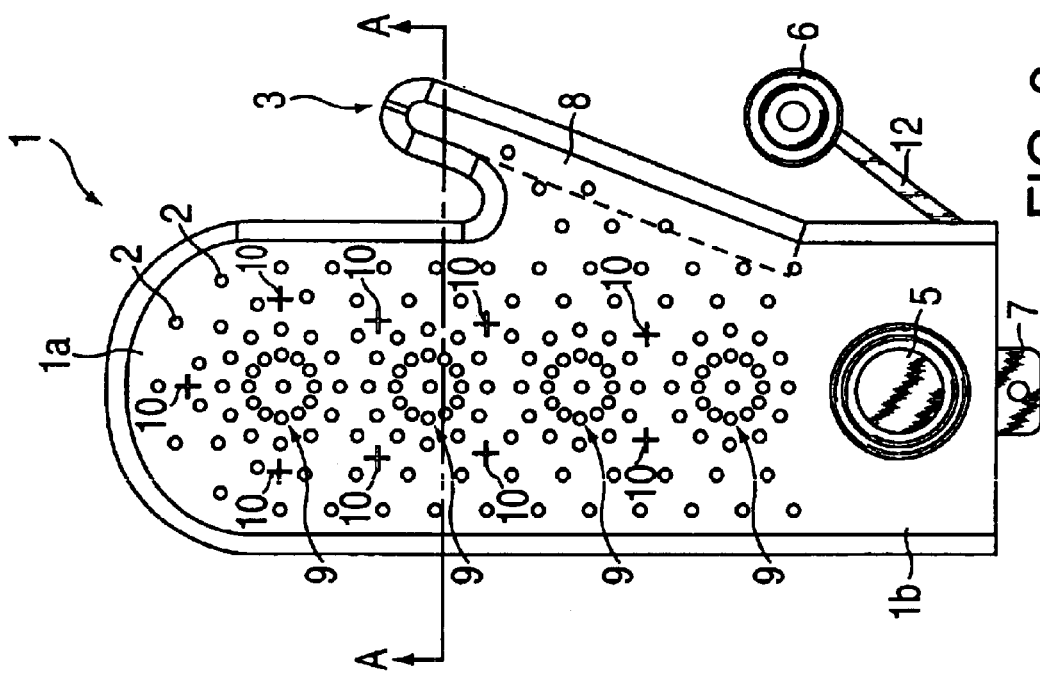

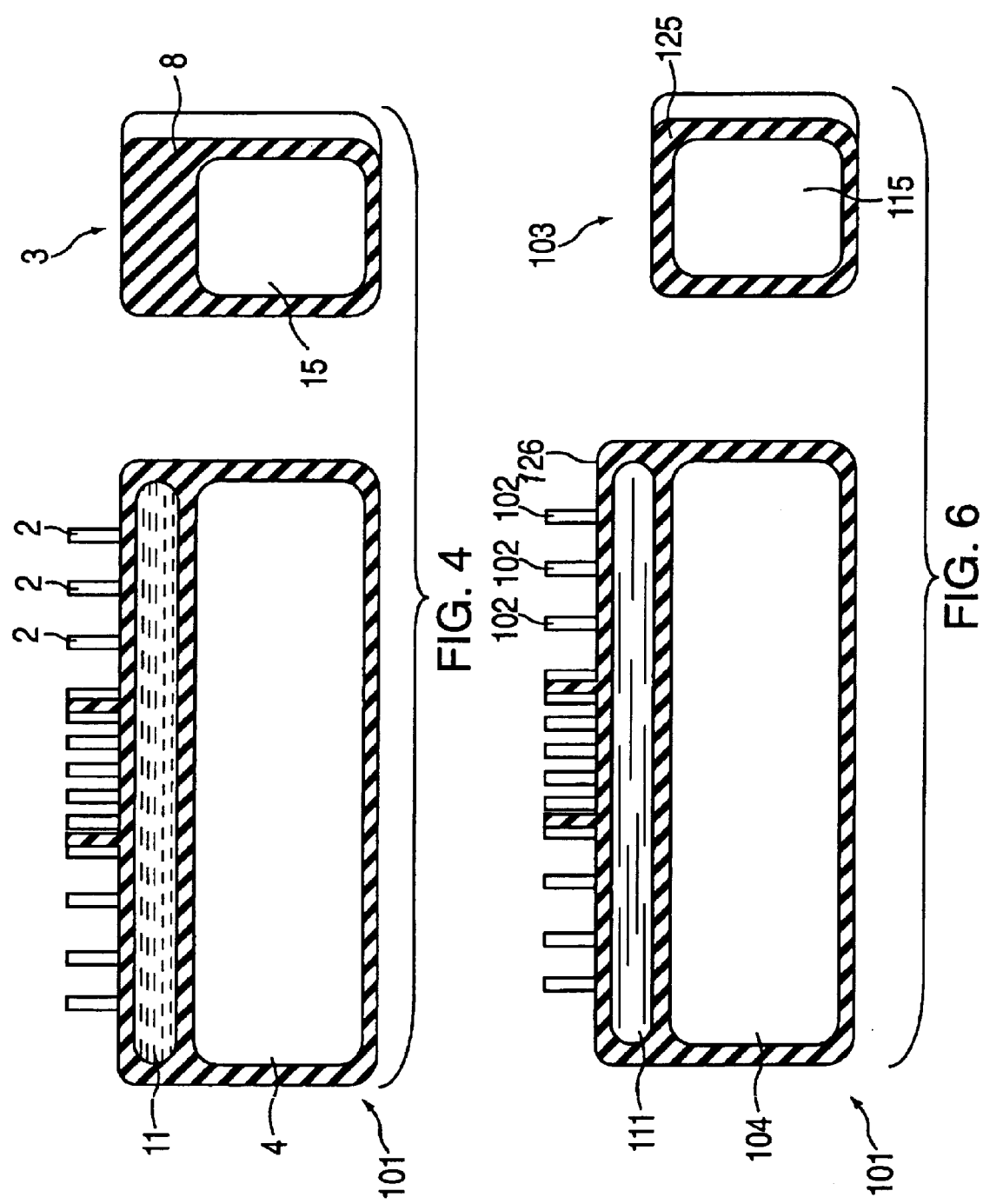

PET GROOMING MITT WITH CONTINUOUS RESERVOIR

This application is a continuation of application Ser. No. 09/235,687, U.S. Pat. No. 6,109,214 filed Jan. 22, 1999, which application is not abandoned.

FIELD OF THE INVENTION

The present invention relates to hand-worn tools for cleansing and grooming pet animals.

BACKGROUND OF THE INVENTION

The grooming and washing of a pet such as a dog usually involves the use of several implements such as sponges, brushes, shampoo bottles and so forth. In addition, implements with rigid handles can often cause pain or injury to a squirming animal. The use of a glove, a mitten or other hand held device expressly designed for the purpose can simplify the process.

The prior art reveals several inventions that are related to the pet grooming or allied processes using such devices.

Davis, U.S. Pat. No. 5,169,251 relates to a hand-worn dispenser in the form of a thin-walled glove with a self-contained receptacle for storing dry or liquid material to be dispensed by squeezing. Having conduits extending from the reservoir along the fingers, sealed distal ends are severable to vary the material discharge rates.

Damm, U.S. Pat. No. 5,009,195 reveals an animal grooming device that is a pad attached to a wide strap which folds over and attaches around the palm of a hand. The pad has hook shaped bristles that are effective in controlling shedding of hairs on animal coats of longhaired dogs or cats.

Moore, U.S. Pat. No. 5,441,335 describes a scrubber device with a waterproof mitt. This is a cleaning device for protecting the hand and providing a bonded cleaning media such as a sponge or abrasive pad covering the palm and finger area. A reservoir for liquid, powder or paste material is located at the wrist dispensing via conduits into the palm pad.

Zielinski, U.S. Pat. No. 4,893,955 involves a therapeutic scrubbing mitten for cleansing the scalp of an infant. It is adapted for cleaning and rinsing with one hand while holding the infant with the other. A reservoir in the palm portion with a slit type seal for filling or emptying can be filled with rinsing water. Soft bristles facilitate scrubbing.

Wolgamuth, U.S. Pat. No. 5,722,349 relates to an ergonomic hand pet washing system consisting of one or two gloves that are worn by the user. The glove or gloves are connected by a resilient hose to a supply of pressurized water. Conduits on the palm side of the gloves split the flow into four streams discharging at the base of the fingers. Means are provided to introduce shampoo into the water stream at a valve assembly upstream of the gloves. A uniform distribution of rubber protrusions or nibs covers the palm and palm side of the glove fingers to aid in agitation of the liquid and massage of the animal.

Freulon, U.S. Pat. No. 4,779,572 describes an apparatus combining a fluid chamber, comb and brush in a common housing hose connected to a vacuum device to wash, comb, and dry an animal in a single operation.

Newkirk et al., U.S. Pat. No. 5,768,709 describes a pet therapeutic glove with cutoff fingers and a thumb hole that can be used with or without a power-operated massager.

Lennon, U.S. Pat. No. 5,524,575 relates to an animal-grooming mitt with a rubber palm portion with nibs to facilitate removal of loose hair during grooming. The body of the mitt may be made of rigid material.

Courtney et al., U.S. Pat. No. 5,682,837 describes a pet glove with fingers or finger holes adaptable to use one or more resilient pads with bristles. In some embodiments, the bristle pads are removably attached to the palm side of the glove.

Dowdy, U.S. Pat. No. 4,083,327 relates to a hand-held motor-driven apparatus using a flexible toothed belt guided by two pulleys to remove animal hairs, massage and distribute natural oils on an animal such as a horse.

While these prior art devices solve some of the problems associated with pet grooming, they do not incorporate the unique combination of features of the present invention.

They do not provide a pet grooming mitt which includes a large reservoir for dispensing cleaning fluid, such as shampoo, in an area extending from the distal finger tip area to the wrist area of the user, while providing a bristle pattern that both grooms animal fur, while dislodging fur hair snags during washing.

OBJECTS OF THE INVENTION

Therefore, the objects of the present invention are as follows:

It is an object of the present invention to provide a pet grooming mitt which includes a large reservoir for dispensing cleaning fluid, such as shampoo, from the whole hand area of a cleaning mitt, while also providing a bristle pattern with a series of densely located bristle groups extending axially through the work surface side of the glove, for dislodging animal fur hair snags during washing a pet animal.

It is also an object of this invention to provide a rubber mitt with built-in reservoir and discharge and massage features for efficient pet grooming.

It is a further object of this invention to provide a flu purposeful pattern of rubber nibs on the palm side to engage pet hairs, to remove loose hairs, and to provide effective massage.

It is another object of the present invention to permit the grooming mitten to be molded of rubber in a single cost-effective operation.

It is yet another object of this invention to provide a rigid thumb section to provide stability to the mitten to permit more effective and rapid use.

It is also an object of this invention to permit easy discharging of cleaning fluid over the entire surface of the palm side of the mitt.

It is also an object of this invention to improve over the disadvantages of the prior art.

SUMMARY OF THE INVENTION

In keeping with these objects and others which may become apparent, the present invention includes a cleaning mitt for the grooming and washing of a pet, such as a cat or dog, which replaces the need for separate implements such as sponges, brushes, shampoo bottles and so forth. The cleaning mitt is gentle during washing of a squirming animal.

The present invention is preferably a rubber mitt with a built-in flexible reservoir for cleaning fluids, such as shampoo. In a preferred embodiment, the reservoir extends all the way from the distal fingertip end to the wrist end of the mitt. A plurality of valves are strategically placed throughout the palm side of the mitt to distribute a plurality of streams of fluid from the mitt.

In a preferred embodiment the mitt has a deliberately dense pattern of rubber nibs along the mid-line on the palm side of the mitt to engage pet hairs, to loosen hair snags and remove loose hairs, and to massage the animal's fur coat.

Furthermore, the grooming mitten is preferably molded of a strong, flexible material, such as rubber.

Optionally, a rigid thumb section has a longitudinally extending thick section to add structural stability to the mitt during use, so that it can be guided along the backs and other fur surfaces of a pet animal being cleaned. This rigid thumb section enables a user to gently glide the mitt over the animal, while easily discharging cleaning fluid from the entire surface of the palm side of the mitt.

The mitt has a selected pattern of flexible nibs, such as rubber nibs or bristles, protruding from the palm side of the mitt. The reservoir includes a reservoir filling port with an integrally molded stopper, and an optional hanging tab with a hole for drying mitt after wet use.

For example, there is a plurality of circular nib patterns, such as four, including a central nib with two concentric circles of nibs. These circular patterns are especially effective at massage and for removing loose hairs when a circular scrubbing motion is used. These denser patterns of nibs generally extend axially along a mid-line of the glove extending from the closed distal fingertip end to the open wrist end of the mitt.

The high density of nibs in these regions provides a substantial force, which can be exerted against the fur and hide of the animal without collapsing the nibs from their perpendicular direction of use, even though they are fabricated of the same soft rubber material of the rest of mitt.

To effectively discharge shampoo over the entire mitt area, the fluid reservoir extends over the entire palm and finger portions of the mitt. Discharge of the shampoo is through openable valves, such as crossed knife slits, which are distributed over the cleaning palm side surface of the mitt. These slit openings are the fluid discharge openings, which normally remain closed when no internal pressure is built up and the palm is kept essentially flat.

When, however, the mitt is flexed so that the nib bearing cleaning side assumes a concave configuration, an internal pressure builds up, and the crossed knife slits constrict in length, so that their respective edges bow out and open for discharge of fluid, such as shampoo, therethrough.

In the rigid thumb embodiment, the thumb portion has a thumbhole, which is surrounded by rubber, which is substantially thicker at the top. This thickness of the thumb portion helps make the mitten more rigid, with less tendency to collapse during use, while the palm section can still be flexed to conform to the animal's contours.

In an alternate embodiment of the invention, the thumb is no longer reinforced or rigidized by a thick top section, for use in cleaning smaller animals where more flexibility is needed.

BRIEF DESCRIPTION OF THE DRAWINGS

The present invention can best be understood in conjunction with the accompanying drawings, in which:

FIG. 1 is a perspective view of the mitt of the present invention;

FIG. 2 is a top plan view of the palm side thereof;

FIG. 3 is a side elevation view of the mitt of the present invention;

FIG. 4 is a cross sectional view of the mitt showing a hand cavity, thumb hole, and fluid reservoir;

DETAILED DESCRIPTION OF THE INVENTION

Figure 5:
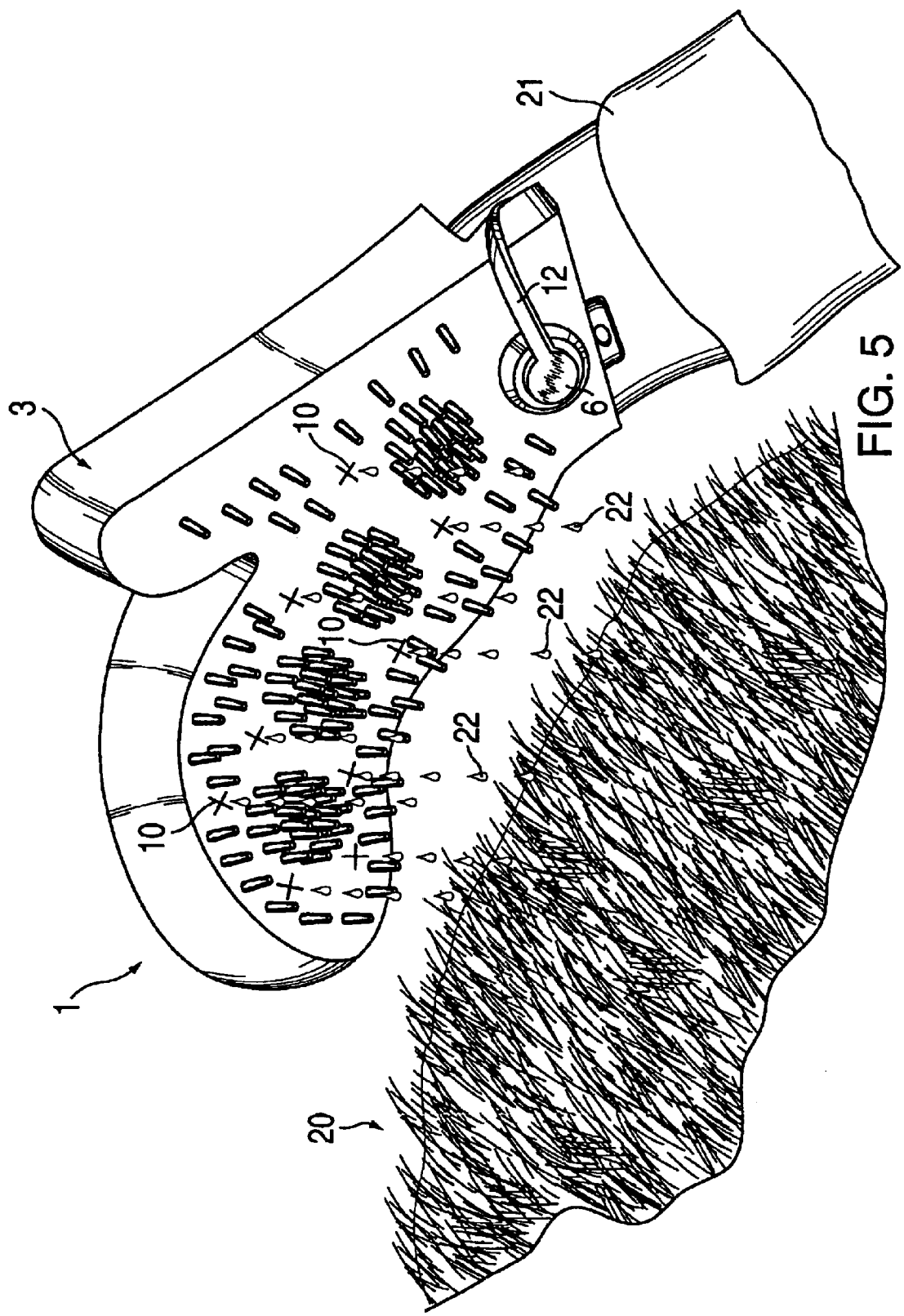
FIG. 5 is a perspective view of the mitt shown discharging cleaning fluid therefrom; and, FIG. 6 is a cross sectional view of an alternate embodiment of the mitt; and, FIG. 7 is an alternate embodiment for a brush version of the present invention.

The pet grooming mitt or mitten of this invention is shown, in FIG. 1. Preferably, it includes molded rubber mitt 1 with rubber nibs 2 protruding from the palm side with thumb section 3, an internal reservoir 11 having a reservoir filling port 5, integrally molded stopper 6, and hanging tab 7 with a hole. Hollow hand cavity. 4 is shown under fluid reservoir 11.

FIG. 2 shows a palm side view with reservoir port 5 open and stopper 6 attached via strap 12. A plurality of nib patterns 9, such as four, preferably circular, include a central nib with two concentric circles of nibs. These nib patterns 9 are especially effective at massage, in loosening fur hair snags and in removing loose hairs, when a circular motion is applied with mitt 1 to the animal's fur and hide.

The high density of nibs 2 in these circular regions of nib patterns 9 insures that a substantial force can be exerted against the hide of the animal without collapsing the nibs 2 (such as rubber bristles) from their perpendicular direction even though they are fabricated of the same soft rubber material of the rest of mitt 1.

It is further noted that preferably these patterns 9 of denser placed nibs 2 in circular patterns extend axially along a mid line of mitt 1, from closed distal end 1a to open wrist end 1b of mitt 1.

A similar design feature that compensates for the softness of the rubber used is rigid thumb 3, which is facilitated by thick section 8 shown in phantom lines. This can be seen in the side view of FIG. 3 as well. Fluid reservoir 11 preferably extends over the entire palm area of mitt 1.

For fluid discharge, valves, such as several crossed knife slits 10, are distributed over the work surface of the palm side of mitt 1. These slits 10 are the fluid discharge openings, which normally remain closed when no internal pressure is built up and the palm is kept essentially flat.

FIG. 4 is a cross sectional view of mitt 1 at line A—A of FIG. 2. Hand cavity 4 as well as fluid reservoir 11 can be clearly seen. Thumb section 3 appears detached because of the line of the cross section. Thumb hole 15 is surrounded by rubber which is substantially thicker at top 8 thereof, which helps make mitt 1 more rigid with less tendency to collapse, while the palm section can still be flexed to conform to the animal's contours.

FIG. 5 shows a perspective view of mitt 1 in use but spaced momentarily away from the animal's surface 20 to view the pattern of fluid drips 22 from discharge slits 10 as the palm section of mitt 1 is flexed downward in a concave pattern, thereby distorting discharge slits 10 and pressurizing reservoir 11. FIG. 5 also shows stopper 6 in a sealing position and that the user's arm 21 is also shown.

FIG. 6 is a cross sectional view similar to FIG. 4 but of an alternate embodiment of the present invention for a mitt 101 having hand portion 104, reservoir 111 and nibs 102 whereby thumb section 130 with thumb cavity 115 is no longer reinforced or "rigidized" by a thick top section. This construction may be of some advantage for smaller animals where more flexibility is desired or for gloves molded of more rigid grades of rubber (or of a thermoplastic elastomer) that may be more rigid in general. In this embodiment, top 125 of thumb section 130 of mitt 101 is no longer co-planar with top 126 of the palm section of mitt 101.

Figure 7:
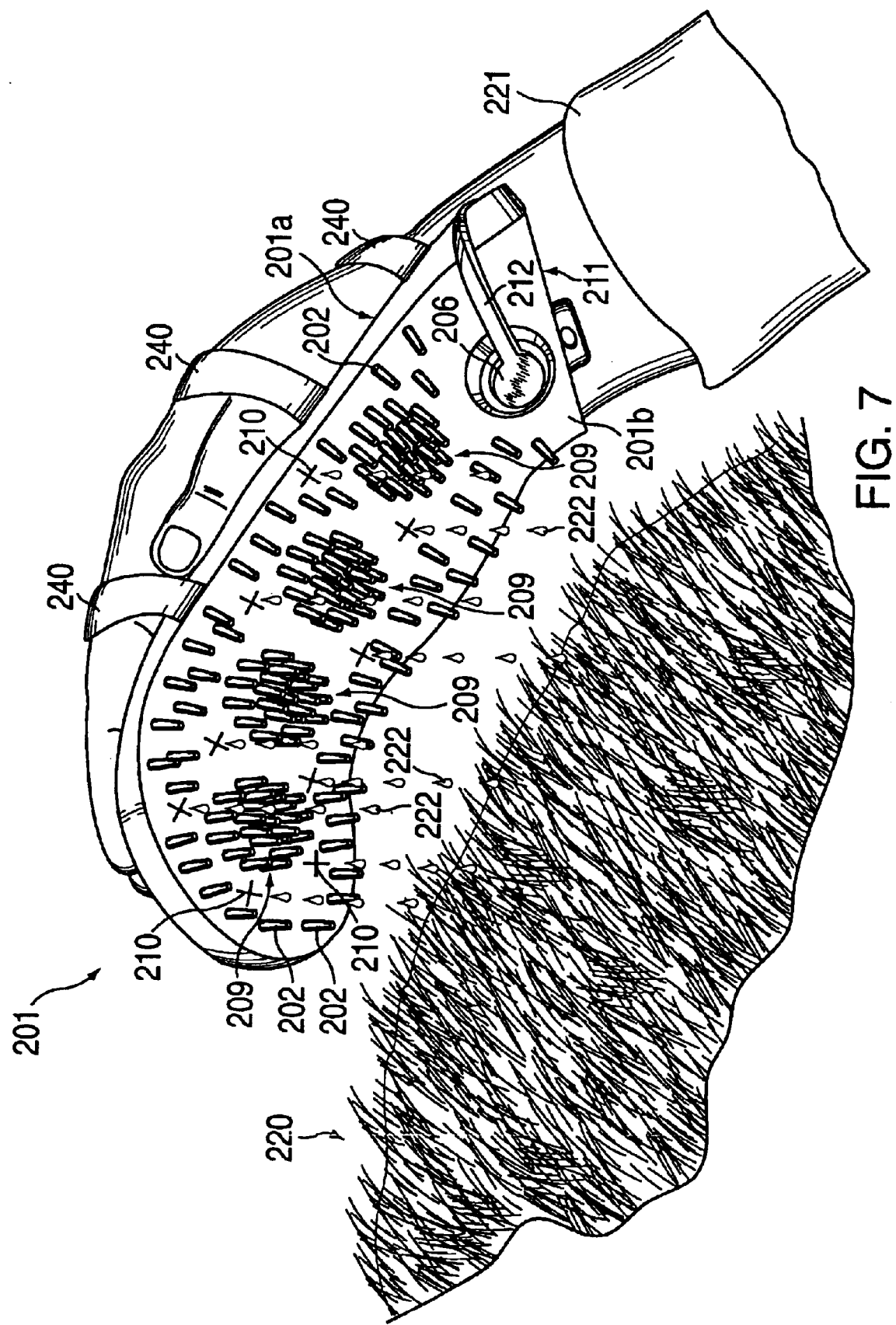

FIG. 7 shows an alternate embodiment for a flexible brush 201 having a rear side 201a co-extensive with a front palm side cleaning work surface 201b. Brush 201 is a flexible body having one or more straps 240 for engaging the hand of a user 221 therein on rear side 201a of brush 201. Built-in fluid reservoir 211 extends within brush 201, and is capped by stopper 206 attached by strap 212 to brush 201. Fluid drops 222 are discharged from slits 210 to animal 220, when internal pressure builds up in reservoir 211 upon concave flexing of brush 201. Preferably bristle nibs 202 are arranged in denser concentric patterns 209 along an axially extending mid-line portion of brush 201.

It is further noted that other modifications may be made to the present invention without departing from the scope as noted in the appended claims. For example, the cleaning mitt can be made with the unique, glove-length extending reservoir but with a conventional pattern of bristle nibs. Furthermore, the mitt can alternatively be made with a conventional, smaller fluid reservoir, but with the unique denser pattern of bristle nibs extending preferably in concentric patterns along a mid-line of the cleaning surface side of the mitt.

I claim:

1. A grooming and washing mitt for a pet animal said mitt comprising:
   a hollow flexible body having a flexible rear side co-extensive with a flexible palm side cleaning surface so that said hollow body is flexible with an open end for insertion of a hand into said body and a separate hollow thumb portion extending therefrom,
   a built-in bendable, unencumbered fluid retaining reservoir for discharging fluid extending continuously within said body from a top of a distal fingertip end to a bottom of a proximal wrist end adjacent to said open end of said body, and transversely from one side to an opposite side of said mitt including extending into said thumb portion, and means comprising discharge ports for discharging fluid from said reservoir upon flexing of said mitt to form a concave configuration of said palm side pressurizing said reservoir causing said discharge ports to open;
   said mitt having means on said palm side of said mitt for removing loose hairs on said pet comprising a predetermined denser pattern of flexible, solid nibs, said nibs also providing an effective massage, said denser pattern of nibs extending along a central median from said distal fingertip of said mitt to sad proximal wrist end of said mitt.

2. The mitt as in claim 1 wherein said plurality of discharge ports extends through a large portion of said palm side of said mitt, said ports discharging cleaning fluid over said cleaning work surface of said palm side of said mitt.

3. The mitt as in claim 2 wherein said medially extending dense pattern of nibs consists of a row along said central median of a spaced plurality of nib patterns a having a central nib with a concentric rings of nibs surrounding each central nib for massaging and removing hair snags and loose hairs when a motion of said mitt is used, wherein said dense pattern of nibs provides a substantial force to be exerted against the hide of the animal without collapsing said nibs from a perpendicular direction extending from said palm side work surface of said mitt.

4. The mitt as in claim 3 wherein said mitt further includes a reservoir filling port and an integrally molded stopper removably attachable to said reservoir filling port whereby said reservoir can contain cleaning fluid when said stopper is attached to said reservoir filling port.

5. The mitt as in claim 4 further comprising a hanging tab for suspending said mitt therefrom.

6. The mitt as in claim 5 wherein said mitt is molded of rubber.

7. The method of grooming and washing a pet animal comprising the steps of
   filling a mitt through a port with grooming fluid, said mitt comprising a hollow flexible body having a flexible rear side co-extensive with a flexible palm side cleaning surface so that said hollow body is flexible with an open end for insertion of a hand into said body and a separate, flexible hollow thumb portion extending therefrom, a built-in fluid retaining reservoir for said fluid extending continuously within said body from a top of a distal fingertip end to a bottom of a proximal wrist end adjacent to said open end of said body providing a predetermined pattern of flexible, solid nibs, said nibs providing an effective massage, said pattern of nibs being a series of rounded concentric rings of nibs, and transversely from one side to an opposite side of said mitt including extending into said thumb portion, means comprising creased knife slits for discharging fluid from said reservoir upon flexing of said mitt to form a concave configuration of said palm side pressurizing said reservoir causing said crossed knife slits to open, and means on said palm side of said mitt for removing loose hairs on said pet comprising a predetermined pattern of flexible, solid nibs;
   closing said port to contain the grooming fluid within said reservoir;
   placing a hand into said mitt;
   placing said mitt on a pet animal with the palm side in contact with said pet animal;
   bending said mitt to form a concave shape of said palm side to release fluid into contact with said pet animal; and
   massaging said pet animal, collecting loose hair by said nibs.

8. A grooming and washing mitt for a pet animal said mitt comprising:
   a hollow flexible body having a flexible rear side coextensive with a flexible palm side cleaning surface so that said hollow body is flexible with an open end for insertion of a hand into said body and a separate hollow thumb portion extending therefrom,
   a built-in bendable, unencumbered fluid retaining reservoir for discharging fluid extending continuously within said body from a top of a distal fingertip end to a bottom of a proximal wrist end adjacent to said open end of said body, and transversely from one side to an opposite side of said mitt including extending into said thumb portion, and means comprising disk ports for discharging fluid from said reservoir upon flexing of said mitt to form a concave configuration of said palm side pressurizing said reservoir causing said discharge ports to open;
   said mitt having means on said palm side of said mitt for removing loose hairs on said pet comprising a predetermined denser pattern of a series of concentric rings of flexible, solid nibs, said nibs also providing an effective massage said denser pattern of nibs extending from said distal fingertip of said mitt to said proximal wrist end of said mitt.

* * * * *